(12) United States Patent
Wang et al.

(10) Patent No.: US 12,341,172 B2
(45) Date of Patent: Jun. 24, 2025

(54) HEATING CONTROL METHOD FOR ENERGY STORAGE, ENERGY STORAGE SYSTEM, AND PHOTOVOLTAIC ENERGY STORAGE SYSTEM

(71) Applicant: Huawei Digital Power Technologies Co., Ltd., Shenzhen (CN)

(72) Inventors: Gang Wang, Xi'an (CN); Aitang Chen, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 36 days.

(21) Appl. No.: 18/527,628

(22) Filed: Dec. 4, 2023

(65) Prior Publication Data

US 2024/0194967 A1  Jun. 13, 2024

(30) Foreign Application Priority Data

Dec. 7, 2022 (CN) .......................... 202211562184.1

(51) Int. Cl.

| | |
|---|---|
| *H01M 10/63* | (2014.01) |
| *H01M 10/42* | (2006.01) |
| *H01M 10/48* | (2006.01) |
| *H01M 10/615* | (2014.01) |
| *H01M 50/512* | (2021.01) |

(Continued)

(52) U.S. Cl.
CPC ......... *H01M 10/63* (2015.04); *H01M 10/425* (2013.01); *H01M 10/482* (2013.01); *H01M 10/615* (2015.04); *H01M 50/512* (2021.01); *H02J 3/32* (2013.01); *H02J 3/38* (2013.01); *H02J 7/00032* (2020.01); *H02J 7/0013* (2013.01); *H02J 7/0048* (2020.01); *H02J 7/007194* (2020.01); *H02J 7/35* (2013.01); *H01M 2010/4271* (2013.01); *H02J 2207/20* (2020.01); *H02J 2300/26* (2020.01)

(58) Field of Classification Search
CPC .. H01M 10/63; H01M 10/615; H01M 50/512; H01M 10/425; H01M 10/482; H01M 10/41; H01M 10/48; H02J 7/00; H02J 7/00032; H02J 7/007104; H02J 7/0048; H02J 3/32; H02J 3/38; H02J 7/0013; H02J 7/35; H02J 2207/20; H02J 2300/26
See application file for complete search history.

(56) References Cited

FOREIGN PATENT DOCUMENTS

| | | |
|---|---|---|
| CN | 105553012 B | 6/2018 |
| CN | 116053660 A | 5/2023 |

*Primary Examiner* — Robert L Deberadinis
(74) *Attorney, Agent, or Firm* — Maier & Maier, PLLC

(57) ABSTRACT

An energy storage system includes a controller and a plurality of battery packs connected in parallel. The battery pack includes a cell pack, a temperature sensing module, a temperature control module, and a battery management system (BMS). The temperature sensing module is configured to detect a temperature of the battery pack, the temperature control module is configured to heat the battery pack, and the BMS is configured to send heating requests and states of charge (SOCs) of corresponding battery packs to the controller. The controller determines, based on a difference between a voltage of a direct-current bus and a charging voltage reference value of the energy storage system, a quantity of battery packs whose temperature control modules can be enabled, and determines, based on the SOCs of the battery packs, priorities for enabling the temperature control modules of the battery packs, enhancing utilization of power generation power.

17 Claims, 2 Drawing Sheets

(51) Int. Cl.
*H02J 3/32* (2006.01)
*H02J 3/38* (2006.01)
*H02J 7/00* (2006.01)
*H02J 7/35* (2006.01)

HEATING CONTROL METHOD FOR ENERGY STORAGE, ENERGY STORAGE SYSTEM, AND PHOTOVOLTAIC ENERGY STORAGE SYSTEM

CROSS-REFERENCE TO RELATED APPLICATIONS

This application claims priority to Chinese Patent Application No. 202211562184.1, filed on Dec. 7, 2022, which is hereby incorporated by reference in its entirety.

TECHNICAL FIELD

The embodiments relate to the field of solar energy storage technologies to a heating control method for energy storage of an photovoltaic energy storage system, and an photovoltaic energy storage system.

BACKGROUND

In recent years, demands for residential photovoltaic supporting energy storage systems have gradually emerged, and residential energy storage systems are experiencing explosive growth. For safety considerations, an energy storage system is usually installed outdoors. Therefore, when an air temperature decreases at night, a temperature of an electrochemical cell in the energy storage system may be less than 0° C.

At present, lithium-ion cells are widely used in photovoltaic energy storage systems because of high power density, long cycle life, low self-discharge rate, no memory effect, and other advantages. However, electrochemical performance of the lithium-ion cell is relatively poor under a low-temperature condition. This is mainly due to the following three reasons. First, an electrolyte in the lithium-ion cell has increased viscosity, and may even be partially solidified, causing a conductivity decrease to the electrolyte. Second, compatibility between the electrolyte and a negative electrode and compatibility between the electrolyte and a membrane barrier deteriorate. Third, a diffusion coefficient of lithium ions inside positive-electrode and negative-electrode active substances is decreased, and charge transfer impedance (Rct) is significantly increased. In addition, even if the temperature rises in daytime, because the lithium-ion cell has a large heat capacity and slow temperature rise, it is still possible that the electrochemical cell in an energy storage system has limited charging power or even cannot be charged, causing a waste of photovoltaic power-generation power. Therefore, when a charging capacity of the energy storage system is limited due to a low temperature, a heating apparatus needs to be used to heat the electrochemical cell, so as to increase the temperature of the electrochemical cell, thereby increasing available charging power of the energy storage system and decreasing a photovoltaic waste. However, in the industry, electric power of the energy storage system is usually used to heat the electrochemical cell, and this easily causes a decrease to an electric quantity of the energy storage system.

SUMMARY

Currently, for a problem that a temperature of an electrochemical cell in an energy storage system is excessively low and a charging effect is relatively poor at under a low-temperature condition, the electrochemical cell can be heated at fixed power in the industry. When the temperature of the electrochemical cell rises to a corresponding heating-exit temperature, heating is disabled. However, this technology needs to ensure that power for heating the electrochemical cell is sufficient. A source for heating the electrochemical cell may come from outside the energy storage system or the energy storage system itself. When photovoltaic power-generation power outside the energy storage system is insufficient, electric power of the energy storage system may need to be used, and this easily causes a decrease to an electric quantity of the energy storage system.

In view of this, embodiments provide a heating control method for energy storage, an energy storage system, and an photovoltaic energy storage system, so as to fully utilize power-generation power of a photovoltaic array under a low-temperature condition, heat an energy storage cell in an energy storage system, improve a charging capacity of the energy storage cell, and avoid a waste of photovoltaic power-generation power and a decrease of an electric quantity of the energy storage cell.

According to a first aspect, an embodiment provides a heating control method for energy storage. The method is applied to an photovoltaic energy storage system, and the photovoltaic energy storage system includes a photovoltaic array, an inverter, and an energy storage system. The photovoltaic array is formed by connecting a plurality of photovoltaic modules in series and in parallel. The inverter includes a direct-current bus, a DC/DC converter, and a DC/AC converter. The DC/DC converter is connected to the DC/AC converter by using the direct-current bus. The DC/DC converter is further connected to the photovoltaic array and performs maximum power point tracking (MPPT) on power-generation power from the photovoltaic array. The DC/AC converter is further connected to a load and/or a power grid. The energy storage system includes a plurality of battery packs connected in parallel and a controller. A parallel connection point of the plurality of battery packs is connected to the controller or the direct-current bus. It should be noted that when the controller is a standalone device, the parallel connection point of the plurality of battery packs is connected to the controller, and the controller is connected to the direct-current bus. When the controller is integrated in the inverter, the parallel connection point of the battery packs is connected to the direct-current bus. The battery pack includes a cell pack, a temperature control module, a temperature sensing module, and a battery management system (BMS). The cell pack is configured to store and release electric energy, the temperature control module is configured to heat the battery pack, the temperature sensing module is configured to detect a temperature of the battery pack, and the BMS is configured to receive, manage, and send the temperature, a current, a voltage, a state of charge (SOC), and other information of the battery pack.

The method is as follows: the controller receives heating requests of the battery packs and states of charge (SOCs) of the battery packs, and the controller adjusts, based on a difference between a voltage of the direct-current bus and a charging voltage reference value of the energy storage system, a quantity N of battery packs whose temperature control modules are to be enabled, where N is an integer greater than or equal to 1. The controller determines, based on the SOCs of the plurality of battery packs, priorities for enabling the respective temperature control modules of the plurality of battery packs, and enables the temperature control modules of the N battery packs in the plurality of battery packs.

It should be noted that the voltage of the direct-current bus is related to the power-generation power of the photovoltaic array, charging power of the battery packs in the energy storage system, and output power of the inverter, and the charging voltage reference value of the energy storage system is related to an input voltage of the photovoltaic array, a voltage of the power grid, and the voltages of the battery packs. A size of the difference between the voltage of the direct-current bus and the charging voltage reference value of the energy storage system represents whether the power-generation power of the photovoltaic array is sufficient. For example, when the difference between the voltage of the direct-current bus and the charging voltage reference value of the energy storage system is a positive value, it indicates that the power-generation power of the photovoltaic array is relatively large, and the power-generation power of the photovoltaic array not only can charge the battery packs of the energy storage system but also has a remaining part. When the difference between the voltage of the direct-current bus and the charging voltage reference value of the energy storage system is zero, it indicates that the power-generation power of the photovoltaic array can meet a charging requirement of the battery packs of the energy storage system but has no remaining part. When the difference between the voltage of the direct-current bus and the charging voltage reference value of the energy storage system is a negative value, it indicates that the power-generation power of the photovoltaic array is relatively small, and the power-generation power of the photovoltaic array is insufficient to charge the battery packs of the energy storage system and has no remaining part. Based on this, if the power-generation power of the photovoltaic array can charge the battery packs of the energy storage system and has a remaining part, the energy storage system heats the battery packs by using this part of remaining energy, to increase available charging power of the battery packs and avoid a waste of the photovoltaic power-generation power. In addition, to better avoid a "buckets effect", that is, to convert as much power-generation power of the photovoltaic array as possible into energy stored in the battery packs, the energy storage controller of the energy storage system determines, based on the SOCs of the battery packs, the priorities of the battery packs for enabling the temperature control modules, so as to more fully utilize the power-generation power of the photovoltaic array.

In some possible implementations, as described above, when the voltage of the direct-current bus is greater than the charging voltage reference value of the energy storage system, the power-generation power of the photovoltaic array can charge the battery packs of the energy storage system, and has a remaining part of energy. In this case, the controller controls, in an ascending order of the SOCs, the temperature control modules of the first N battery packs in the energy storage system to be enabled, so as to increase temperatures of the N battery packs. Such arrangement can enable a battery pack with an SOC ranked lower to be preferentially heated, thereby increasing available charging power of the battery pack to better convert and store electric energy generated by the photovoltaic array. It should be noted that the charging voltage reference value of the energy storage system varies with sizes of the voltage of the power grid, the input voltage of the photovoltaic array, and the voltages of the battery packs, and the charging voltage reference value of the energy storage system is greater than the voltage of the power grid and the input voltage of the photovoltaic array.

In some possible implementations, when the voltage of the direct-current bus is greater than the charging voltage reference value of the energy storage system, but the power-generation power of the photovoltaic array decreases, the difference between the voltage of the direct-current bus and the charging voltage reference value of the energy storage system decreases (the difference is still a positive value), and the input voltage of the battery packs decreases. As the input voltage of the battery packs decreases, the power-generation power of the photovoltaic array cannot charge the battery packs of the energy storage system while keeping the temperature control modules of the N battery packs enabled. Therefore, under this condition, the cell packs in the battery packs automatically supply power to the temperature control modules, so as to keep the temperature control modules in the N battery packs enabled. However, as described above, if the electrochemical cells of the battery packs discharge power to the temperature control modules, energy of the battery packs is consumed. Therefore, to avoid using the electric power of the battery packs, when the controller receives a signal indicating that the cell packs discharge power to the temperature control modules, the controller disables the temperature control modules corresponding to all the battery packs, to avoid consumption of the electric power of the battery packs. Similarly, that the input voltage of the battery packs is less than a preset value indirectly reflects that the power-generation power of the photovoltaic array cannot charge the battery packs of the energy storage system while keeping the temperature control modules of the N battery packs enabled. Therefore, when the controller receives a signal indicating that the input voltage of the battery packs is less than a preset value, the controller also disables the temperature control modules corresponding to all of the plurality of battery packs, so that consumption of the electric power of the battery packs is avoided, and the energy storage system enters a next heating cycle.

Further, in the next heating cycle, when the temperature control modules of all the battery packs are in a disabled state and the voltage of the direct-current bus is greater than the charging voltage reference value of the energy storage system, the controller controls again, based on SOCs of battery packs that send heating requests and in an ascending order of the SOCs, temperature control modules of first L battery packs in the energy storage system to be enabled, so as to increase temperatures of the L battery packs, where L is a positive integer less than N. For example, L=N−1, L=N−2, or the like. In other words, in this heating cycle, a quantity of battery packs whose temperature control modules are enabled in the energy storage system is decreased. Such arrangement can enable a battery pack with an SOC ranked higher in the previous heating cycle to preferentially exit from heating. This avoids simultaneously enabling excessive temperature control modules, to better match the power-generation power of the photovoltaic array at the moment. For example, if the power-generation power of the photovoltaic array continuously decreases, the energy storage system keeps entering new heating cycles, and a quantity of battery packs whose temperature control modules can be enabled in the energy storage system continuously decreases, until the temperature control modules of all of the plurality of battery packs in the energy storage system are disabled.

It should be noted that if the power-generation power of the photovoltaic array still continuously decreases after the temperature control modules of all of the plurality of battery packs in the energy storage system are disabled, the voltage of the direct-current bus is less than the charging voltage reference value of the energy storage system, and the power-generation power of the photovoltaic array cannot charge the battery packs.

In some possible implementations, after the controller controls the temperature control modules of the N battery packs to be enabled, when the power-generation power of the photovoltaic array increases, that is, the difference between the voltage of the direct-current bus and the charging voltage reference value of the energy storage system increases (the difference is a positive value), the input voltage of the battery packs gradually increases. As the input voltage of the battery packs increases, the power-generation power of the photovoltaic array can charge the battery packs of the energy storage system while keeping the temperature control modules of the N battery packs enabled, and still has a remaining part of power. Therefore, under this condition, the energy storage system enters a next heating cycle, to better adapt to a change of the power-generation power of the photovoltaic array. For example, when the controller receives a signal indicating that the input voltage of the battery packs is greater than a preset value, or when the controller does not receive, in a period of time (for example, ten minutes), a signal indicating that the cell packs in the battery supply power to the temperature control modules, the controller controls the energy storage system to enter a next heating cycle.

Further, in the next heating cycle, the controller controls again, based on SOCs of battery packs that send heating requests and in an ascending order of the SOCs, the temperature control modules of the first M battery packs in the energy storage system to be enabled, so as to increase temperatures of the M battery packs, where M is an integer greater than N. For example, M=N+1 or M=N+2. In other words, in this heating cycle, a quantity of battery packs whose temperature control modules are enabled in the energy storage system is increased. Such arrangement can enable the temperature control modules of more battery packs with SOCs ranked lower to be enabled, so as to more fully utilize the power-generation power of the photovoltaic array, and increase available charging power of the energy storage system. For example, if the power-generation power of the photovoltaic array continuously increases, the energy storage system keeps entering new heating cycles, and a quantity of battery packs whose temperature control modules can be enabled in the energy storage system to continuously increase, until the temperature control modules of all of the plurality of battery packs in the energy storage system are enabled.

It should be noted that if the power-generation power of the photovoltaic array still continuously increases after the temperature control modules of all the battery packs in the energy storage system are enabled, the DC/DC converter in the inverter adjusts the power-generation power of the photovoltaic array, to avoid causing charging damage to the battery packs.

According to a second aspect, an embodiment provides an energy storage system. The energy storage system includes a controller and a plurality of battery packs connected in parallel. A parallel connection point of the plurality of battery packs is connected to the controller or a direct-current bus. The battery pack includes a cell pack, a temperature control module, a temperature sensing module, and a BMS. The cell pack is electrically connected to the temperature control module and the BMS, the temperature sensing module is electrically connected to the BMS, and the BMS is electrically connected to the controller. In addition, the cell pack is configured to store and release electric energy, the temperature control module is configured to emit heat to increase a temperature of the battery pack, the temperature sensing module is configured to detect the temperature of the battery pack, the BMS is configured to receive, manage, and send the temperature, a current, a voltage, an SOC, and other information of the battery pack, and the controller is configured to receive heating requests of the battery packs and states of charge (SOCs) of the battery packs, and the controller adjusts, based on a difference between a voltage of the direct-current bus and a charging voltage reference value of the energy storage system, a quantity N of battery packs whose temperature control modules are to be enabled, where N is an integer greater than or equal to 1. The controller determines, based on the SOCs of the plurality of battery packs, priorities for enabling the respective temperature control modules of the plurality of battery packs, and enables the temperature control modules of the N battery packs in the plurality of battery packs.

It should be noted that the voltage of the direct-current bus is related to the power-generation power of the photovoltaic array, charging power of the battery packs in the energy storage system, and output power of the inverter, and the charging voltage reference value of the energy storage system is related to an input voltage of the photovoltaic array, a voltage of the power grid, and the voltages of the battery packs. A size of the difference between the voltage of the direct-current bus and the charging voltage reference value of the energy storage system represents whether an photovoltaic energy storage system has sufficient photovoltaic power-generation power. For example, when the difference between the voltage of the direct-current bus and the charging voltage reference value of the energy storage system is a positive value, it indicates that the power-generation power of the photovoltaic array is relatively large, and the power-generation power of the photovoltaic array not only can charge the battery packs of the energy storage system but also has a remaining part. When the difference between the voltage of the direct-current bus and the charging voltage reference value of the energy storage system is zero, it indicates that the power-generation power of the photovoltaic array can meet charging of the battery packs of the energy storage system but has no remaining part. When the difference between the voltage of the direct-current bus and the charging voltage reference value of the energy storage system is a negative value, it indicates that the power-generation power of the photovoltaic array is relatively small, and the power-generation power of the photovoltaic array is insufficient to charge the battery packs of the energy storage system and has no remaining part. Based on this, if the power-generation power of the photovoltaic array can meet charging for battery packs of energy storage and has a remaining part, the energy storage system heats the battery packs by using this part of remaining energy, to increase available charging power of the battery packs and avoid a waste of the photovoltaic power-generation power. In addition, to better avoid a "buckets effect", that is, to convert as much power-generation power of the photovoltaic array as possible into energy stored in the battery packs, the energy storage controller of the energy storage system determines, based on the SOC values of the battery packs, the priorities of the battery packs for enabling the temperature control modules, so as to more fully utilize the power-generation power of the photovoltaic array.

In some possible implementations, as described above, when the voltage of the direct-current bus is greater than the charging voltage reference value of the energy storage system, the power-generation power of the photovoltaic array can charge the battery packs of the energy storage system, and has a remaining part of energy. In this case, the controller controls, in an ascending order of the SOCs, the temperature control modules of the first N battery packs in the energy storage system to be enabled, so as to increase temperatures of the N battery packs. Such arrangement can enable a battery pack with an SOC ranked lower to be preferentially heated, thereby increasing available charging power of the battery pack to better convert and store electric energy generated by the photovoltaic array. It should be noted that the charging voltage reference value of the energy storage system varies with sizes of the voltage of the power grid, the input voltage of the photovoltaic array, and the voltages of the battery packs, and the charging voltage reference value of the energy storage system is greater than the voltage of the power grid and the input voltage of the photovoltaic array.

In some possible implementations, when the power-generation power of the photovoltaic array decreases, the difference between the voltage of the direct-current bus and the charging voltage reference value of the energy storage system decreases (the difference is a positive value), and the input voltage of the battery packs decreases (regardless of impact of the power grid). As the input voltage of the battery packs decreases, the power-generation power of the photovoltaic array cannot charge the battery packs of the energy storage system while keeping the temperature control modules of the N battery packs enabled. Therefore, under this condition, the cell packs in the battery packs automatically supply power to the temperature control modules, so as to keep the temperature control modules in the N battery packs enabled. However, as described above, if the electrochemical cells of the battery packs discharge power to the temperature control modules, electric power of the battery packs is consumed. Therefore, to avoid using the electric power of the battery packs, when the controller receives a signal indicating that the cell packs discharge power to the temperature control modules, the controller disables the temperature control modules corresponding to all the battery packs. Similarly, that the input voltage of the battery packs is less than a preset value indirectly reflects that the power-generation power of the photovoltaic array cannot charge the battery packs of the energy storage system while keeping the temperature control modules of the N battery packs enabled. Therefore, when the controller receives a signal indicating that the input voltage of the battery packs is less than a preset value, the controller disables the temperature control modules corresponding to all of the plurality of battery packs, to avoid a decrease of an electric quantity of the battery packs. The energy storage system enters a next heating cycle.

Further, in the next heating cycle, when the temperature control modules of all of the plurality of battery packs are in a disabled state and the voltage of the direct-current bus is greater than the charging voltage reference value of the energy storage system, the controller controls again, based on SOCs of battery packs that send heating requests and in an ascending order of the SOCs, temperature control modules of first L battery packs in the energy storage system to be enabled, so as to increase temperatures of the L battery packs, where L is an integer less than N. For example, L=N−1, L=N−2, or the like. In other words, the controller decreases a quantity of battery packs whose temperature control modules are enabled in the energy storage system. Such arrangement can enable a battery pack with an SOC ranked higher in the previous heating cycle to preferentially exit from heating. This avoids simultaneously enabling excessive temperature control modules, to better match the power-generation power of the photovoltaic array at the moment. For example, if the power-generation power of the photovoltaic array continuously decreases, the energy storage system keeps entering new heating cycles, and a quantity of battery packs whose temperature control modules can be enabled in the energy storage system continuously decreases, until the temperature control modules of all of the plurality of battery packs in the energy storage system are disabled.

It should be noted that if the power-generation power of the photovoltaic array still continuously decreases after the temperature control modules of all of the plurality of battery packs in the energy storage system are disabled, the voltage of the direct-current bus is less than the charging voltage reference value of the energy storage system, and the power-generation power of the photovoltaic array can no longer charge the battery packs.

In some possible implementations, after the controller controls the temperature control modules of the N battery packs to be enabled, when the power-generation power of the photovoltaic array increases, that is, the difference between the voltage of the direct-current bus and the charging voltage reference value of the energy storage system increases, the input voltage of the battery packs gradually increases. As the input voltage of the battery packs increases, the power-generation power of the photovoltaic array can charge the battery packs of the energy storage system while keeping the temperature control modules of the N battery packs enabled, and still has a remaining part of power. Therefore, under this condition, the energy storage system enters a next heating cycle, to better adapt to a change of the power-generation power of the photovoltaic array. For example, when the controller receives a signal indicating that the input voltage of the battery packs is greater than a preset value, or when the controller does not receive, in a period of time (for example, ten minutes), a signal indicating that the cell packs in the battery supply power to the temperature control modules, the controller controls the energy storage system to enter a next heating cycle.

Further, in the next heating cycle, the controller controls again, based on SOCs of battery packs that send heating requests and in an ascending order of the SOCs, the temperature control modules of the first M battery packs in the energy storage system to be enabled, so as to increase temperatures of the M battery packs, where M is an integer greater than N. For example, M=N+1, M=N+2, or the like. In other words, in this heating cycle, a quantity of battery packs whose temperature control modules are enabled in the energy storage system is increased. Such arrangement can enable the temperature control modules of more battery packs with SOCs ranked lower to be enabled, so as to more fully utilize the power-generation power of the photovoltaic array, and increase available charging power of the energy storage system. For example, if the power-generation power of the photovoltaic array continuously increases, the energy storage system keeps entering new heating cycles, and a quantity of battery packs whose temperature control modules can be enabled in the energy storage system to continuously increase, until the temperature control modules of all the battery packs in the energy storage system are enabled.

It should be noted that if the power-generation power of the photovoltaic array still continuously increases after the temperature control modules of all of the plurality of battery packs in the energy storage system are enabled, a DC/DC converter in the inverter adjusts the power-generation power of the photovoltaic array, to avoid causing charging damage to the battery packs.

According to a third aspect, an embodiment provides an photovoltaic energy storage system. The photovoltaic energy storage system includes the energy storage system according to any implementation of the second aspect and an inverter. The inverter includes a DC/DC converter, a DC/AC converter, and a direct-current bus. The energy storage system is connected to the inverter by using the direct-current bus.

According to the heating control method for energy storage of an photovoltaic energy storage system, the energy storage system, and the photovoltaic energy storage system provided in the embodiments, the energy storage system or the photovoltaic energy storage system can be enabled to heat the battery packs without consuming the electric power of the energy storage system. Thus, for example, the quantity of temperature control modules enabled in the energy storage system and the enabling priorities are automatically adjusted based on the power-generation power of the photovoltaic array. This not only avoids a waste of photovoltaic power at a low temperature, but also avoids a problem that heating the battery packs by using the electric power of the energy storage system causes a decrease to the electric quantity of the energy storage system, without affecting normal power scheduling of the photovoltaic energy storage system.

DETAILED DESCRIPTION OF EMBODIMENTS

Under the background of peak carbon dioxide emissions and carbon neutrality, a proportion of installation of new-energy devices increases gradually. "Photovoltaics+energy storage" has gradually become a standard configuration for photovoltaic development. The combination of photovoltaics and energy storage can provide a more sustained motive force of development for photovoltaic power generation. Generally, an photovoltaic energy storage system includes a photovoltaic array, an inverter, and an energy storage system. In a case of sufficient lighting, the photovoltaic energy storage system may store electric energy generated by the photovoltaic array in the energy storage system. In addition, a direct current generated by the photovoltaic array may further be supplied to a load or a power grid by using inversion of the inverter. In a case of insufficient lighting, the energy storage system may output a direct current. The direct current continues to provide electric energy for the load after being inverted by the inverter.

In a residential photovoltaic energy storage scenario, battery packs of the energy storage system can be installed outside. As a result, charging power and discharging power of the battery packs are easily affected by an ambient temperature. For example, the battery pack can be a lithium-ion battery. When an outdoor temperature is relatively low, in the lithium-ion battery, an electrolyte has increased viscosity and increased impedance, and charging power and discharging power decrease. Therefore, it is crucial to increase a temperature of the battery pack in time to recover the charging power and discharging power of the battery pack.

Based on this, embodiments provide a heating control method for energy storage of an photovoltaic energy storage system, an energy storage system, and an photovoltaic energy storage system. In this method, a quantity of temperature control modules enabled in the energy storage system and enabling priorities may be automatically adjusted based on power-generation power of a photovoltaic array. This not only avoids a waste of photovoltaic power at a low temperature, but also avoids a problem that heating the battery packs by using electric power of the energy storage system causes a decrease to an electric quantity of the energy storage system, without affecting normal power scheduling of the photovoltaic energy storage system.

To enable a person skilled in the art to better understand solutions, embodiments are described below with reference to accompanying drawings.

Figure 1:
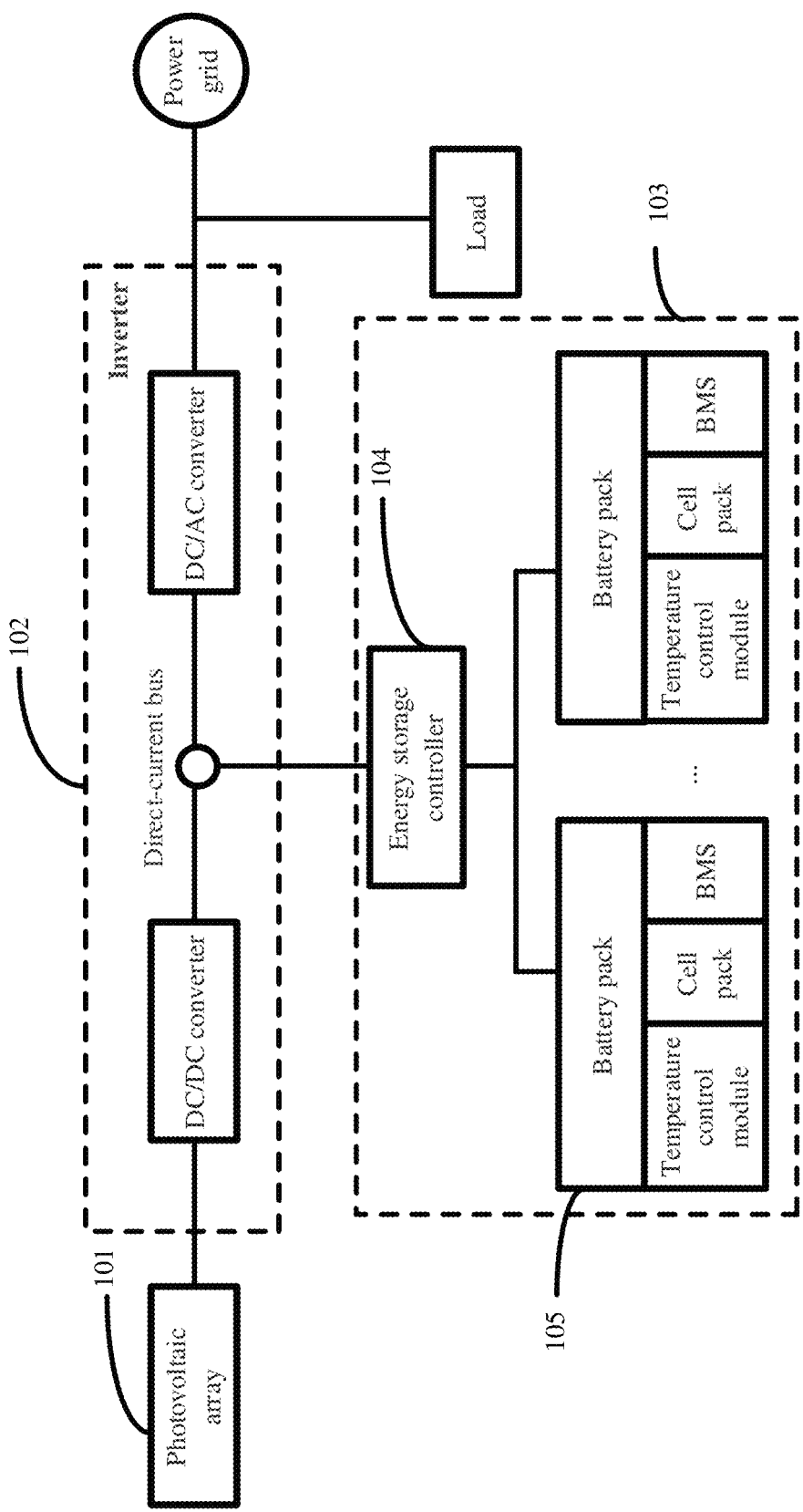
FIG. 1 is a schematic diagram of a structure of an photovoltaic energy storage system according to an embodiment.

FIG. 1 is a schematic diagram of a structure of an photovoltaic energy storage system according to an embodiment. As shown in FIG. 1, the photovoltaic energy storage system includes a photovoltaic array 101, an inverter 102, and an energy storage system 103. The photovoltaic array 101 is formed by connecting a plurality of photovoltaic modules in series and in parallel, and is configured to convert solar radiant energy into a direct current. The inverter 102 includes a DC/DC (direct current/direct current) converter, a DC/AC (direct current/alternating current) converter, and a direct-current bus. The energy storage system 103 includes a plurality of battery packs 105 connected in parallel and an energy storage controller 104. When the energy storage controller 104 is a standalone device (as shown in FIG. 1), a parallel connection point of the plurality of battery packs 105 is connected to the energy storage controller 104, and the energy storage controller 104 is connected to the direct-current bus. When the energy storage controller 104 is integrated in the inverter 102 (not shown in the figure), a parallel connection point of the battery packs 105 is connected to the direct-current bus. The battery pack 105 includes a temperature control module, a cell pack, a BMS, and a temperature sensing module (not shown in the figure).

For example, the photovoltaic modules in the photovoltaic array 101 include one or more types of monocrystalline silicon solar modules, polycrystalline silicon solar modules, amorphous silicon solar modules, cadmium telluride thin film modules, gallium arsenide thin film modules, copper indium gallium selenide thin film modules, cadmium sulfide thin film modules, dye-sensitized solar modules, organic flexible solar modules, and perovskite thin film modules. This is not limited in the embodiments.

The DC/DC converter and the DC/AC converter of the inverter 102 may be integrated into one device, or may be split into a plurality of devices. In a discharge working condition, a direct-current input side of the DC/DC converter is connected to the photovoltaic array 101, to convert a direct current output by the photovoltaic array 101 into a proper direct current to meet an operating requirement of the DC/AC converter. In addition, maximum power point tracking (MPPT) is performed on the direct current output by the photovoltaic array 101, to obtain maximum power-generation power of the photovoltaic array 101, and output the direct current from a direct-current output side of the DC/DC converter. The direct-current output side of the DC/DC converter is connected to a direct-current input side of the DC/AC converter. The DC/AC converter converts the received direct current into an alternating current, which is then output from an alternating-current output side of the DC/AC converter. A coupling point between the direct-current output side of the DC/DC converter and the direct-current input side of the DC/AC converter is the direct-current bus. In other words, the direct-current bus is a wire between a positive electrode and a negative electrode that are between the DC/DC converter and the DC/AC converter. In an on-grid scenario, a direct current generated by the photovoltaic array 101 is inverted by the inverter 102 into an alternating current and transferred to a power grid. In an off-grid scenario, a direct current generated by the photovoltaic array 101 and/or transferred by the energy storage system 103 is transferred to a load by using the inverter 102.

The plurality of battery packs 105 are connected in parallel to each other. As external devices, the battery packs 105 may be connected to a bus of the inverter 102, in other words, the battery packs 105 may be connected between the DC/DC converter and the DC/AC converter. Further, the cell pack in the battery pack 105 is configured to store electric energy from the power grid or the photovoltaic modules: the temperature control module is configured to increase/decrease a temperature of an electrochemical cell: the temperature sensing module is configured to detect the temperature of the electrochemical cell, and report temperature information of the electrochemical cell to the BMS in the battery pack: and the BMS is configured to receive, manage, and send information about a temperature, a current, a voltage, and an SOC of the cell pack. In addition, the cell pack is electrically connected to the temperature control module, the temperature control module is electrically connected to the direct-current bus and the BMS, the temperature sensing module is electrically connected to the BMS, and the BMS is electrically connected to the energy storage controller 104.

For example, an electrochemical cell in the cell pack may include one or more of a lithium iron phosphate cell, a lithium cobalt oxide cell, a lithium manganese oxide cell, a nickel-cobalt-aluminum ternary cell, a lithium titanate oxide cell, a nickel-cobalt-manganese ternary cell, a lead carbon cell, a nickel-hydrogen cell, a nickel-cadmium cell, and a lead-acid cell.

For example, the temperature control module may include various types of heating devices, for example, a positive temperature coefficient (PTC), an electric heating wire, an electric heating film, a thermoelectric cooler, and the like. The electric heating film includes a translucent polyester film that can emit heat after being energized, and is made of conductive special ink and a metal current-carrying bar that are processed and hot pressed between insulating polyester films. The electric heating film is soft and has a large heat-emitting area. It can well fit into a battery module and provide a higher temperature-rising speed. The electric heating wire is made of iron-chromium-aluminum alloy, nickel-chromium alloy, and other materials. The electric heating wire has relatively low costs, and can decrease system costs. The thermoelectric cooler is a device that is made by using a Peltier effect of a semiconductor material and that can perform both cooling and heating. The thermoelectric cooler can switch between cooling and heating only by changing a direction of a direct current that passes through the thermoelectric cooler. As the thermoelectric cooler can perform both cooling and heating, when a temperature of a battery module is excessively high, the thermoelectric cooler may further cool the battery module.

For example, the temperature sensing module is a sensing apparatus for detecting a temperature of the electrochemical cell in the battery pack 105, the sensing apparatus includes one or more temperature sensors, and the temperature sensor includes a thermocouple type or a resistance type. The temperature sensing module can fit into various locations on a battery surface, so as to detect the temperature of the electrochemical cell in the battery pack 105 in real time, and report temperature information of the electrochemical cell to the BMS.

In some possible implementations, the temperature sensing modules of the battery packs 105 in the energy storage system 103 detect temperature information of the cell packs in real time, and report the temperature information of the cell packs to the BMS. When temperatures of the cell packs are less than a threshold, the BMSs of the battery packs 105 send heating requests to the energy storage controller 104, and report SOCs of the corresponding battery packs 105 to the energy storage controller 104.

The energy storage controller 104 receives the heating requests and the SOCs of the battery packs 105: determines, based on a difference between a voltage of the direct-current bus and a charging voltage reference value of the energy storage system 103, a quantity of battery packs 105 whose temperature control modules are to be enabled: and determines, based on the SOCs of the battery packs 105 that send the heating requests, priorities of the battery packs 105 for enabling the temperature control modules.

It should be noted that the voltage of the direct-current bus is related to the power-generation power of the photovoltaic array 101, charging power of the battery packs 105 in the energy storage system 103, and output power of the inverter, and the charging voltage reference value of the energy storage system 103 is related to an input voltage of the photovoltaic array 101, a voltage of the power grid, and voltages of the battery packs. A size of the difference between the voltage of the direct-current bus and the charging voltage reference value of the energy storage system 103 represents whether the power-generation power of the photovoltaic array 101 is sufficient. For example, when the difference between the voltage of the direct-current bus and the charging voltage reference value of the energy storage system 103 is a positive value, it indicates that the power-generation power of the photovoltaic array 101 is relatively large, and the power-generation power of the photovoltaic array 101 not only can charge the battery packs 105 of the energy storage system 103 but also has a remaining part. When the difference between the voltage of the direct-current bus and the charging voltage reference value of the energy storage system 103 is zero, it indicates that the power-generation power of the photovoltaic array 101 can meet a charging requirement of the battery packs 105 of the energy storage system 103 but has no remaining part. When the difference between the voltage of the direct-current bus and the charging voltage reference value of the energy storage system 103 is a negative value, it indicates that the power-generation power of the photovoltaic array 101 is relatively small, and the power-generation power of the photovoltaic array 101 is insufficient to charge the battery packs 105 of the energy storage system 103 and has no remaining part. Based on this, if the power-generation power of the photovoltaic array 101 can charge the battery packs 105 of the energy storage system 103 and has a remaining part, the energy storage system 103 heats the battery packs 105 by using this part of remaining energy, to increase available charging power of the battery packs 105 and avoid a waste of the power-generation power of the photovoltaic array 101. In addition, to better avoid a "buckets effect", that is, to convert as much power-generation power of the photovoltaic array 101 as possible into energy stored in the battery packs 105, the energy storage controller 104 of the energy storage system 103 determines, based on the SOCs of the battery packs 105, the priorities of the battery packs 105 for enabling the temperature control modules, so as to more fully utilize the power-generation power of the photovoltaic array 101.

In some possible implementations, as described above, when the voltage of the direct-current bus is greater than the charging voltage reference value of the energy storage system 103, the power-generation power of the photovoltaic array 101 can charge the battery packs 105 of the energy storage system 103, and has a remaining part of energy. In this case, the energy storage controller 104 controls, in an ascending order of the SOCs, temperature control modules of first N battery packs 105 in the energy storage system 103 to be enabled, so as to increase temperatures of the N battery packs 105. Such arrangement can enable a battery pack 105 with an SOC ranked lower to be preferentially heated, thereby increasing available charging power of the battery pack to better convert and store electric energy generated by the photovoltaic array 101. It should be noted that the charging voltage reference value of the energy storage system 103 varies with sizes of the voltage of the power grid, the input voltage of the photovoltaic array, and the voltages of the battery packs, and the charging voltage reference value of the energy storage system is greater than the voltage of the power grid and the input voltage of the photovoltaic array.

It should be noted that a sampled value of the voltage of the direct-current bus may be obtained by using a bus voltage controller (not shown in the figure). The bus voltage controller may be a standalone device, or may be integrated into the inverter 102. The charging voltage reference value of the energy storage system 103 can be affected by the voltage of the power grid, the input voltage of the photovoltaic array 101, and the voltages of the battery packs 105, and the charging voltage reference value of the energy storage system 103 is greater than the voltage of the power grid and the input voltage of the photovoltaic array 101.

In some possible implementations, when the voltage of the direct-current bus is greater than the charging voltage reference value of the energy storage system 103, but the power-generation power of the photovoltaic array 101 decreases, the difference between the voltage of the direct-current bus and the charging voltage reference value of the energy storage system 103 decreases, and the input voltage of the battery packs 105 gradually decreases. As the input voltage of the battery packs 105 decreases, the power-generation power of the photovoltaic array 101 cannot charge the battery packs 105 of the energy storage system 103 while keeping the temperature control modules of the N battery packs 105 enabled. Therefore, under this condition, the cell packs in the battery packs 105 automatically supply power to the temperature control modules, so as to keep the temperature control modules in the N battery packs 105 enabled. However, as described above, if the electrochemical cells of the battery packs 105 discharge power to the temperature control modules, energy of the battery packs 105 is consumed. Therefore, to avoid using the electric power of the battery packs 105, when the energy storage controller 104 receives a signal indicating that the cell packs discharge power to the temperature control modules, the energy storage controller 104 disables the temperature control modules corresponding to all the battery packs 105. Similarly, that the input voltage of the battery packs 105 is less than a preset value indirectly reflects that the power-generation power of the photovoltaic array 101 cannot charge the battery packs 105 of the energy storage system 103 while keeping the temperature control modules of the N battery packs 105 enabled. Therefore, when the energy storage controller 104 receives a signal indicating that the input voltage of the battery packs 105 is less than a preset value, the energy storage controller 104 also disables the temperature control modules corresponding to all the battery packs 105, so that consumption of the electric power of the battery packs 105 is avoided, and the energy storage system 103 is ready to enter a next heating cycle. Further, in the next heating cycle, when the temperature control modules of all of the plurality of battery packs 105 are in a disabled state and the voltage of the direct-current bus is greater than the charging voltage reference value of the energy storage system 103, the energy storage controller 104 controls again, based on SOCs of battery packs 105 that send heating requests and in an ascending order of the SOCs, temperature control modules of first L battery packs 105 in the energy storage system 103 to be enabled, so as to increase temperatures of the L battery packs 105, where L is a positive integer less than N. For example, L=N−1, L=N−2, or the like. In other words, in this heating cycle, a quantity of battery packs 105 whose temperature control modules are enabled in the energy storage system 103 is less than that in the previous heating cycle. Such arrangement can enable a battery pack 105 with an SOC ranked higher in the previous heating cycle to preferentially exit from heating. This avoids simultaneously enabling excessive temperature control modules, to better match the power-generation power of the photovoltaic array 101 at the moment.

For example, if the power-generation power of the photovoltaic array 101 continuously decreases, the energy storage system 103 keeps entering new heating cycles, and a quantity of battery packs 105 whose temperature control modules can be enabled in the energy storage system 103 continuously decreases, until the temperature control modules of all of the plurality of battery packs 105 in the energy storage system 103 are disabled.

It should be noted that if the power-generation power of the photovoltaic array 101 still continuously decreases after the temperature control modules of all of the plurality of battery packs 105 in the energy storage system 103 are disabled, the voltage of the direct-current bus is less than the charging voltage reference value of the energy storage system 103, and the power-generation power of the photovoltaic array 101 can no longer charge the battery packs 105.

In some possible implementations, when the power-generation power of the photovoltaic array 101 increases, that is, the difference between the voltage of the direct-current bus and the charging voltage reference value of the energy storage system 103 increases (the difference is a positive value), the input voltage of the battery packs 105 gradually increases. As the input voltage of the battery packs 105 increases, the power-generation power of the photovoltaic array 101 can charge the battery packs 105 of the energy storage system 103 while keeping the temperature control modules of the N battery packs 105 enabled, and still has a remaining part of power. Therefore, under this condition, the energy storage system 103 enters a next heating cycle, to better adapt to a change of the power-generation power of the photovoltaic array 101. For example, when the energy storage controller 104 receives a signal indicating that the input voltage of the battery packs 105 is greater than a preset value, or when the energy storage controller 104 dose not receive, in a period of time (for example, ten minutes), a signal indicating that the cell packs in the battery packs 105 supply power to the temperature control modules, the energy storage controller 104 controls the energy storage system 103 to enter a next heating cycle.

Further, in the next heating cycle, the energy storage controller 104 controls again, based on SOCs of battery packs 105 that send heating requests and in an ascending order of the SOCs, the temperature control modules of the first M battery packs 105 in the energy storage system 103 to be enabled, so as to increase temperatures of the M battery packs 105, where M is a positive integer greater than N. For example, M=N+1, M=N+2, or the like. In other words, in this heating cycle, a quantity of battery packs 105 whose temperature control modules are enabled in the energy storage system 103 is increased. Such arrangement can enable the temperature control modules of more battery packs 105 with SOCs ranked lower to be enabled, so as to more fully utilize the power-generation power of the photovoltaic array 101, and increase available charging power of the energy storage system 103.

For example, if the power-generation power of the photovoltaic array 101 continuously increases, the energy storage system 103 keeps entering new heating cycles, and a quantity of battery packs 105 whose temperature control modules can be enabled in the energy storage system 103 to continuously increase, until the temperature control modules of all of the plurality of battery packs 105 in the energy storage system 103 are enabled.

It should be noted that if the power-generation power of the photovoltaic array 101 still continuously increases after the temperature control modules of all the battery packs 105 in the energy storage system 103 are enabled, the DC/DC converter in the inverter 102 adjusts the power-generation power of the photovoltaic array 101, to avoid causing charging damage to the battery packs 105.

Figure 2:
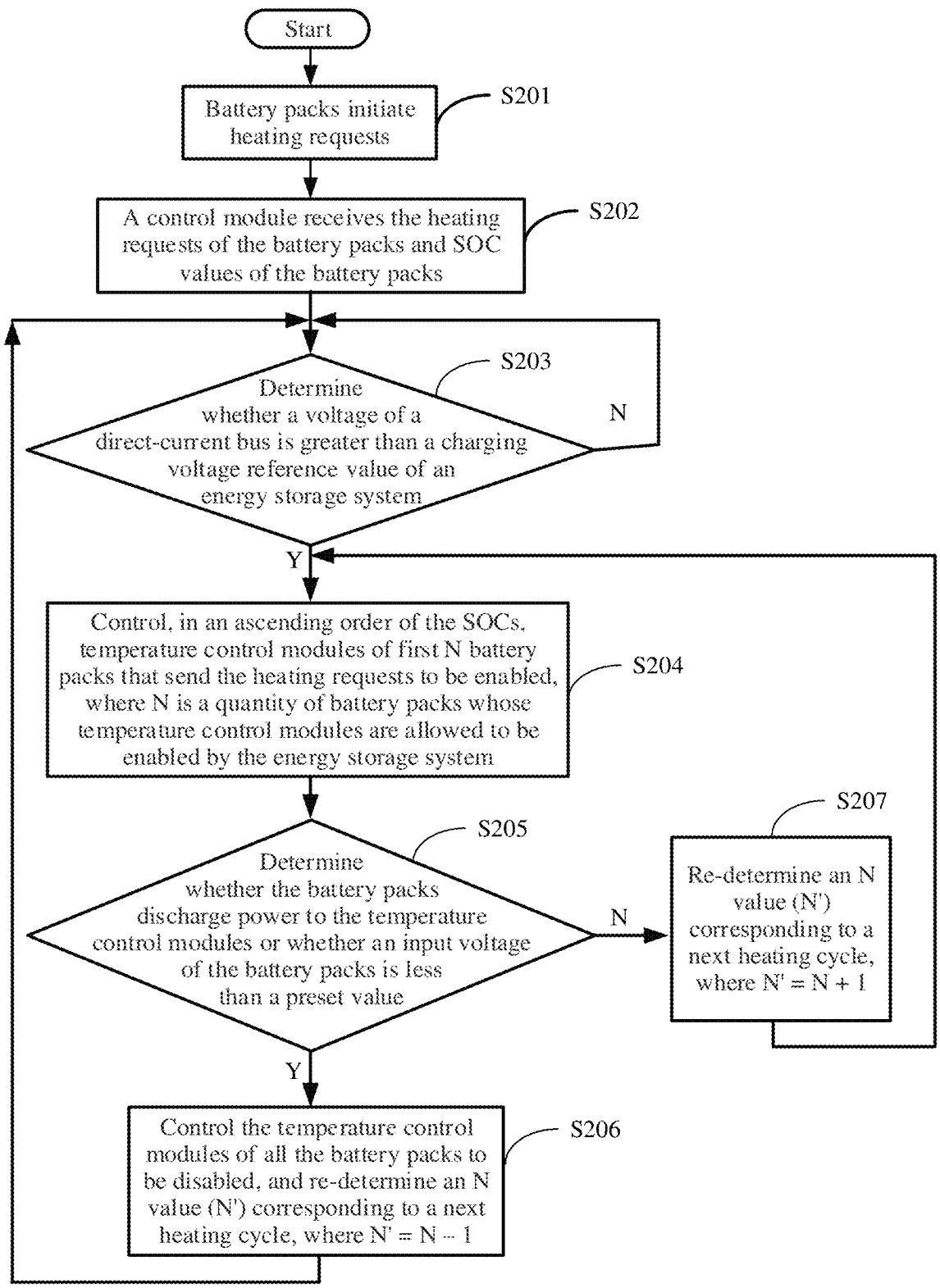
FIG. 2 is a schematic flowchart of a heating control method for energy storage of an photovoltaic energy storage system according to an embodiment.

FIG. 2 is a schematic flowchart of a heating control method for energy storage of an photovoltaic energy storage system according to the embodiments. The control method includes the following steps.

Step S201: Battery packs 105 send heating requests.

When temperatures of the battery packs 105 are lower than a threshold, BMSs of the battery packs 105 send the heating requests to an energy storage controller 104, so as to increase the temperatures of the battery packs 105 and increase available charging power of the battery pack 105.

Step S202: The energy storage controller 104 receives the heating requests of the battery packs 105 and SOCs of the battery packs 105.

The energy storage controller 104 determines, based on the SOCs of the battery packs 105 that send the heating requests, priorities of the battery packs 105 for enabling temperature control modules.

Step S203: The energy storage controller 104 determines whether a voltage of a direct-current bus is greater than a charging voltage reference value of an energy storage system 103.

If the voltage of the direct-current bus is greater than the charging voltage reference value of the energy storage system 103, it indicates that power-generation power of a photovoltaic array 101 is relatively large, and the power-generation power of the photovoltaic array 101 not only can charge the battery packs 105 of the energy storage system 103 but also has a remaining part. When the voltage of the direct-current bus is equal to the charging voltage reference value of the energy storage system 103, it indicates that the power-generation power of the photovoltaic array 101 can meet a charging requirement of the battery packs 105 of the energy storage system 103 but has no remaining part. When the voltage of the direct-current bus is less than the charging voltage reference value of the energy storage system 103, it indicates that the power-generation power of the photovoltaic array 101 is insufficient to charge the battery packs 105 of the energy storage system 103 and has no remaining part.

Step S204: If the voltage of the direct-current bus is greater than the charging voltage reference value of the energy storage system 103, the energy storage controller 104 controls, in an ascending order of the SOC values, temperature control modules of first N battery packs 105 that send heating requests to be enabled, so as to increase temperatures of the battery packs 105 and increase available charging power of the battery packs 105.

N is a quantity of battery packs 105 corresponding to temperature control modules that are allowed to be enabled by the energy storage system 103 in this heating cycle, and N can correspond to different values in different heating cycles.

Such arrangement can enable a temperature control module of a battery pack 105 with an SOC ranked lower to be preferentially enabled, so that a temperature of the battery pack 105 is increased, thereby increasing available charging power of the battery pack 105 to better convert and store electric energy generated by the photovoltaic array 101.

In an implementation, when two or more battery packs 105 have a same SOC value, temperature control modules corresponding to the battery packs 105 may be enabled or disabled in an order of SN codes of the battery packs 105. The priority order of the SN codes of the battery packs 105 is not limited in the embodiments.

Step S205: The energy storage controller 104 determines whether cell packs in the battery packs 105 discharge power to the temperature control modules or whether an input voltage of the battery packs 105 is less than a preset value.

When the energy storage controller 104 receives a signal indicating that the cell packs in the battery packs 105 discharge power to the temperature control modules, or when the energy storage controller 104 receives a signal indicating that the input voltage of the battery packs 105 is less than a preset value, it indicates that the power-generation power of the photovoltaic array 101 cannot charge the battery packs 105 in the energy storage system 103 while keeping the temperature control modules of the N battery packs 105 enabled.

If the energy storage controller 104 receives, in a period of time (for example, ten minutes), a signal indicating that the cell packs in the battery packs 105 do not discharge power to the temperature control modules, or receives a signal indicating that the input voltage of the battery packs 105 is greater than a preset value, it indicates that the power-generation power of the photovoltaic array 101 can charge the battery packs 105 in the energy storage system 103 while keeping the temperature control modules of the N battery packs 105 enabled, and still has a remaining part.

Step S206: If the energy storage controller 104 receives a signal indicating that the cell packs in the battery packs 105 discharge power to the temperature control modules, or receives a signal indicating that the input voltage of the battery packs 105 is less than a preset value, the energy storage controller 104 controls temperature control modules of all of the plurality of battery packs 105 in the energy storage system 103 to be disabled, and re-determines an N value (such as N') corresponding to a next heating cycle, where N'=N−1, N'=N−2, or the like. This is not limited in the embodiments.

In other words, in the next heating cycle, a quantity of battery packs 105 whose temperature control modules are enabled by the energy storage controller 104 is decreased. Subsequently, as the energy storage system 103 enters the next heating cycle, the energy storage controller 104 re-determines relative sizes of the voltage of the direct-current bus and the charging voltage reference value of the energy storage system 103.

For example, if the power-generation power of the photovoltaic array 101 continuously decreases, but the voltage of the direct-current bus is still greater than the charging voltage reference value of the energy storage system 103, the energy storage system 103 keeps entering new heating cycles, and a quantity of battery packs 105 whose temperature control modules can be enabled in the energy storage system 103 continuously decreases, until the temperature control modules of all of the plurality of battery packs 105 in the energy storage system 103 are disabled.

It should be noted that if the power-generation power of the photovoltaic array 101 still continuously decreases after the temperature control modules of all of the plurality of battery packs 105 in the energy storage system 103 are disabled, the voltage of the direct-current bus is less than the charging voltage reference value of the energy storage system 103, and the power-generation power of the photovoltaic array 101 can no longer charge the battery packs 105.

In an implementation, after the energy storage controller 104 re-determines an N value (such as N') corresponding to a next heating cycle, the energy storage system 103 enters the next heating cycle after a period of delay time (for example, five minutes), so as to avoid frequent changes of the N value, and in addition, it can be ensured as far as possible that changed output power of the photovoltaic array 101 is relatively stable.

Step S207: If the energy storage controller 104 does not receive, in a period of time (for example, ten minutes), a signal indicating that the electrochemical cells of the battery packs 105 discharge power to the temperature control modules, or the energy storage controller 104 receives a signal indicating that the input voltage of the battery packs 105 is greater than a preset value, the energy storage controller 104 re-determines an N value (such as N') corresponding to a next heating cycle, where N'=N+1, N'=N+2, or the like. This is not limited in the embodiments.

In other words, in the next heating cycle, a quantity of battery packs 105 whose temperature control modules are enabled by the energy storage controller 104 is increased. Subsequently, as the energy storage system 103 enters the next heating cycle, the energy storage controller 104 re-determines relative sizes of the voltage of the direct-current bus and the charging voltage reference value of the energy storage system 103.

For example, if the power-generation power of the photovoltaic array 101 continuously increases, to better utilize the power-generation power of the photovoltaic array 101, the energy storage system 103 keeps entering new heating cycles, and a quantity of battery packs 105 whose temperature control modules can be enabled in the energy storage system 103 also continuously increases, until the temperature control modules of all the battery packs 105 in the energy storage system 103 are enabled.

It should be noted that if the power-generation power of the photovoltaic array 101 still continuously increases after the temperature control modules of all the battery packs 105 in the energy storage system 103 are enabled, a DC/DC converter in an inverter 102 adjusts the power-generation power of the photovoltaic array 101, to avoid causing charging damage to the battery packs 105.

In an implementation, after the energy storage controller 104 re-determines an N value (such as N') corresponding to a next heating cycle, the energy storage system 103 enters the next heating cycle after a period of delay time (for example, ten minutes), so as to avoid frequent changes of the N value, and in addition, it can be ensured as far as possible that changed output power of the photovoltaic array 101 is relatively stable.

It should be noted that the foregoing embodiments are only used to illustrate the solutions of the embodiments, rather than constitute any limitations thereto. Although described in detail with reference to the foregoing embodiments, it should be understood by a person skilled in the art that he/she may still modify the solutions described in the foregoing embodiments or equivalently replace some or all features therein; and these modifications or replacements do not make the essence of the corresponding solutions depart from the scope of the solutions of the various embodiments.

What is claimed is:

1. A heating control method for energy storage, wherein the method is applied to an photovoltaic energy storage system, the photovoltaic energy storage system comprises a photovoltaic array, an inverter, and an energy storage system, the inverter comprises a DC/DC converter and a DC/AC converter that are connected by using a direct-current bus, the DC/DC converter is connected to the photovoltaic array and performs maximum power point tracking (MPPT) on power-generation power from the photovoltaic array, the DC/AC converter is connected to a load and/or a power grid, the energy storage system comprises a plurality of battery packs connected in parallel and a controller, a parallel connection point of the plurality of battery packs is connected to the controller or the direct-current bus, and the battery pack comprises a cell pack, a temperature control module, a temperature sensing module, and a battery management system (BMS); and the method comprises:
   receiving, by the controller, a heating request of each of the plurality of battery packs and a state of charge (SOC) of each of the plurality of battery packs;
   adjusting, by the controller based on a difference between a voltage of the direct-current bus and a charging voltage reference value of the energy storage system, a quantity N of battery packs whose temperature control modules are to be enabled, wherein Nis an integer greater than or equal to 1; and
   determining, by the controller based on the SOCs of the plurality of battery packs, priorities for enabling the respective temperature control modules of the plurality of battery packs, and enabling the temperature control modules of the N battery packs in the plurality of battery packs.

2. The heating control method for energy storage according to claim 1, further comprising:
   enabling, by the controller in an ascending order of the SOCs of the plurality of battery packs, the temperature control modules of the first N battery packs in the plurality of battery packs in response to the voltage of the direct-current bus is-being greater than the charging voltage reference value of the energy storage system.

3. The heating control method for energy storage according to claim 2, wherein after enabling, by the controller in an ascending order of the SOCs of the plurality of battery packs, the temperature control modules of the first N battery packs in the plurality of battery packs, the method further comprises:
   disabling, by the controller, the temperature control modules corresponding to the plurality of battery packs in response an input voltage of the plurality of battery packs being less than a first preset value or the cell packs in the N battery packs with the temperature control modules enabled supply power to the temperature control modules.

4. The heating control method for energy storage according to claim 3, wherein after disabling, by the controller, the temperature control modules corresponding to the plurality of battery packs, the method further comprises:
enabling, by the controller in an ascending order of SOCs of the plurality of battery packs, temperature control modules corresponding to first L battery packs in the plurality of battery packs, wherein L is a positive integer less than N.

5. The heating control method for energy storage according to claim 2, wherein after enabling, by the controller in an ascending order of the SOCs of the plurality of battery packs, the temperature control modules of the first N battery packs in the plurality of battery packs, the method further comprises:
enabling, by the controller in an ascending order of SOCs of the plurality of battery packs, the temperature control modules corresponding to the first M battery packs in the plurality of battery packs in response to an input voltage of the battery packs being greater than a first preset value, wherein M is an integer greater than N.

6. An energy storage system, comprising:
a controller, and
a plurality of battery packs connected in parallel, a parallel connection point of the plurality of battery packs is connected to the controller or a direct-current bus, the battery pack comprises a cell pack, a temperature control module, a temperature sensing module, and a battery management system (BMS), the cell pack is electrically connected to the temperature control module and the BMS, the temperature sensing module is electrically connected to the BMS, the BMS is electrically connected to the controller, the temperature control module is configured to emit heat to increase a temperature of the battery pack, the temperature sensing module is configured to detect the temperature of the battery pack, the BMS is configured to receive, manage, and send information about the temperature, a current, a voltage, and an SOC of the battery pack, the controller is configured to receive a heating request of each of the plurality of battery packs and a state of charge (SOC) of each of the plurality of battery packs, the controller adjusts, based on a difference between a voltage of the direct-current bus and a charging voltage reference value of the energy storage system, a quantity N of battery packs whose temperature control modules are to be enabled, N is an integer greater than or equal to 1, and the controller determines, based on the SOCs of the plurality of battery packs, priorities for enabling the respective temperature control modules of the plurality of battery packs, and enables the temperature control modules of the N battery packs in the plurality of battery packs.

7. The energy storage system according to claim 6, wherein the controller enables, in an ascending order of the SOCs of the plurality of battery packs, the temperature control modules of the first N battery packs in the plurality of battery packs in response to the voltage of the direct-current bus being greater than the charging voltage reference value of the energy storage system.

8. The energy storage system according to claim 7, wherein after the controller enables, in the ascending order of the SOCs of the plurality of battery packs, the temperature control modules of the first N battery packs in the plurality of battery packs, the controller disables the temperature control modules corresponding to the plurality of battery packs in response to an input voltage of the plurality of battery packs is-being less than a first preset value or the cell packs in the N battery packs with the temperature control modules enabled supply power to the temperature control modules.

9. The energy storage system according to claim 8, wherein after the controller disables the temperature control modules corresponding to the plurality of battery packs, the controller enables, in an ascending order of SOCs of the plurality of battery packs, the temperature control modules corresponding to first L battery packs in the plurality of battery packs, wherein L is a positive integer less than N.

10. The energy storage system according to claim 7, wherein after the controller enables, in the ascending order of the SOCs of the plurality of battery packs, the temperature control modules of the first N battery packs in the plurality of battery packs, the controller enables, in an ascending order of SOCs of the plurality of battery packs, the temperature control modules corresponding to the first M battery packs in the plurality of battery packs in response to an input voltage of the battery packs is being greater than a first preset value, wherein M is an integer greater than N.

11. The energy storage system of claim 6, wherein the plurality of battery packs are lithium-ion batteries.

12. An energy storage system, comprising:
an energy storage system including
a controller, and
a plurality of battery packs connected in parallel, a parallel connection point of the plurality of battery packs is connected to the controller or a direct-current bus, the battery pack comprises a cell pack, a temperature control module, a temperature sensing module, and a battery management system (BMS), the cell pack is electrically connected to the temperature control module and the BMS, the temperature sensing module is electrically connected to the BMS, the BMS is electrically connected to the controller, the temperature control module is configured to emit heat to increase a temperature of the battery pack, the temperature sensing module is configured to detect the temperature of the battery pack, the BMS is configured to receive, manage, and send information about the temperature, a current, a voltage, and an SOC of the battery pack, the controller is configured to receive a heating request of each of the plurality of battery packs and a state of charge (SOC) of each of the plurality of battery packs, the controller adjusts, based on a difference between a voltage of the direct-current bus and a charging voltage reference value of the energy storage system, a quantity N of battery packs whose temperature control modules are to be enabled, N is an integer greater than or equal to 1, and the controller determines, based on the SOCs of the plurality of battery packs, priorities for enabling the respective temperature control modules of the plurality of battery packs, and enables the temperature control modules of the N battery packs in the plurality of battery packs; and
an inverter, the inverter comprises a DC/DC converter, a DC/AC converter, and a direct-current bus, the energy storage system is connected to the inverter by using the direct-current bus, the DC/AC converter is connected to a high-voltage direct-current side of the DC/DC converter, and the DC/AC converter is configured to implement bidirectional conversion between an alternating current and a direct current, so as to convert a direct current from the DC/DC converter or the energy storage system into an alternating current and transfer the alternating current to a power grid or a load, or convert an alternating current from a power grid into a direct current to charge the battery packs in the energy storage system.

13. The energy storage system of claim 12, wherein the controller enables, in an ascending order of the SOCs of the plurality of battery packs, the temperature control modules of the first N battery packs in the plurality of battery packs in response to the voltage of the direct-current bus being greater than the charging voltage reference value of the energy storage system.

14. The energy storage system of claim 13, wherein after the controller enables, in the ascending order of the SOCs of the plurality of battery packs, the temperature control modules of the first N battery packs in the plurality of battery packs, the controller disables the temperature control modules corresponding to the plurality of battery packs in response to an input voltage of the plurality of battery packs being less than a first preset value or the cell packs in the N battery packs with the temperature control modules enabled supply power to the temperature control modules.

15. The energy storage system of claim 14, wherein after the controller disables the temperature control modules corresponding to the plurality of battery packs, the controller enables, in an ascending order of SOCs of the plurality of battery packs, the temperature control modules corresponding to first L battery packs in the plurality of battery packs, wherein L is a positive integer less than N.

16. The energy storage system of claim 13, wherein after the controller enables, in the ascending order of the SOCs of the plurality of battery packs, the temperature control modules of the first N battery packs in the plurality of battery packs, the controller enables, in an ascending order of SOCs of the plurality of battery packs, the temperature control modules corresponding to the first M battery packs in the plurality of battery packs in response to an input voltage of the battery packs being greater than a first preset value, wherein M is an integer greater than N.

17. The energy storage system of claim 12, wherein the plurality of battery packs are lithium-ion batteries.

* * * * *